Aug. 19, 1952    R. L. CRANE    2,607,373
SAFETY CONTROL MECHANISM FOR BAND SAW MACHINES
Filed May 10, 1950    3 Sheets-Sheet 1

Inventor
Robert L. Crane
By his Attorneys
Merchant & Merchant

Aug. 19, 1952   R. L. CRANE   2,607,373
SAFETY CONTROL MECHANISM FOR BAND SAW MACHINES
Filed May 10, 1950   3 Sheets-Sheet 2
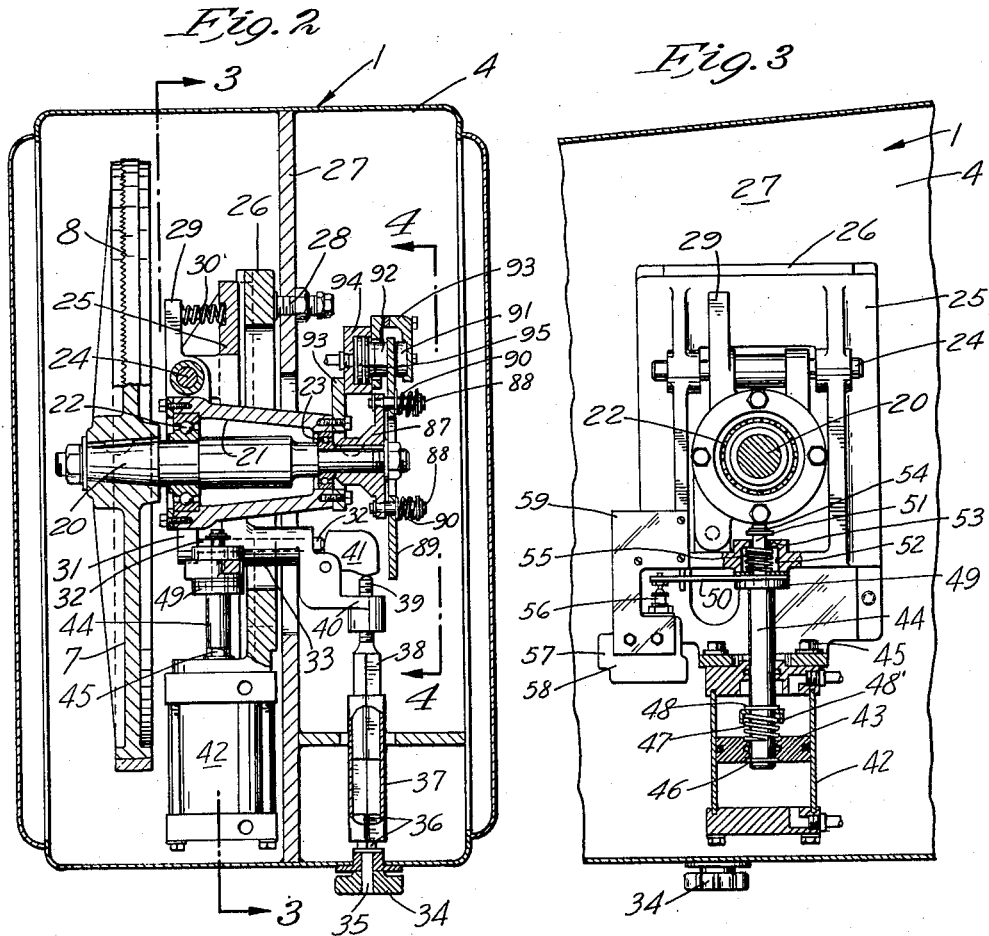
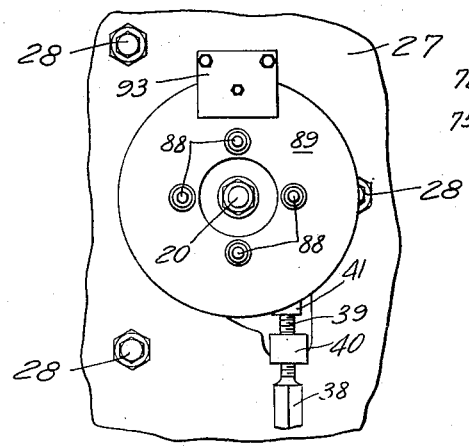
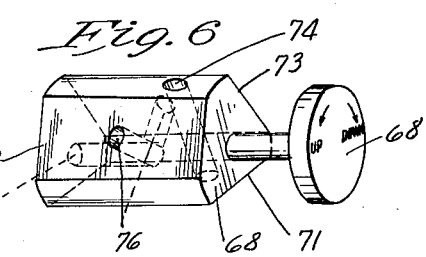
Inventor
Robert L. Crane
By his Attorneys
Merchant & Merchant Aug. 19, 1952   R. L. CRANE   2,607,373
SAFETY CONTROL MECHANISM FOR BAND SAW MACHINES
Filed May 10, 1950                         3 Sheets-Sheet 3
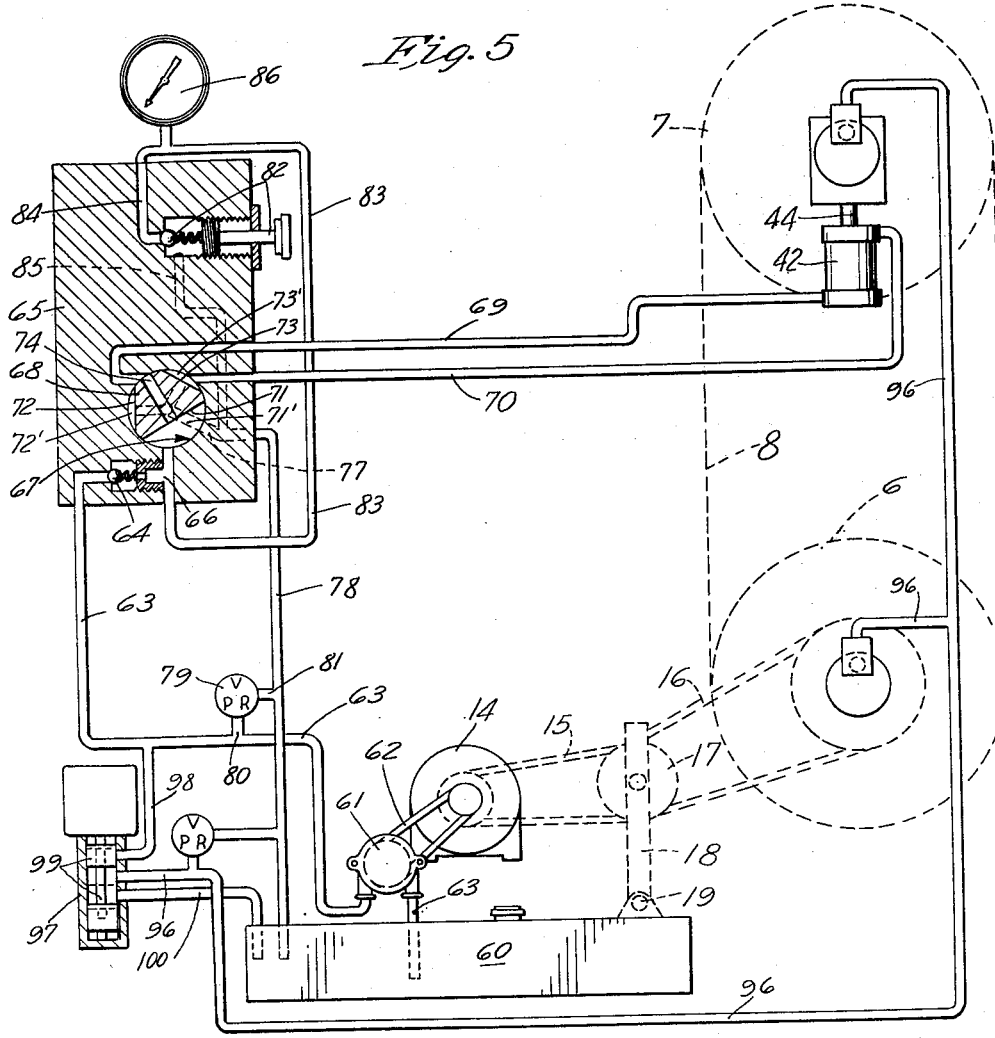
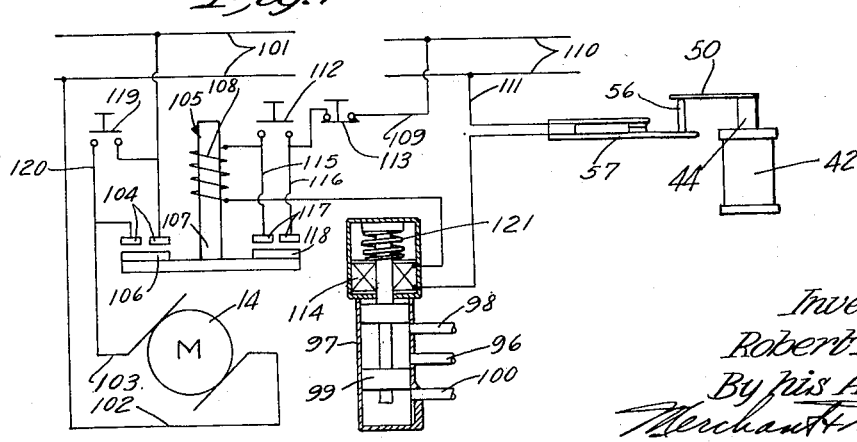
Inventor
Robert L. Crane
By his Attorneys
Merchant & Merchant Patented Aug. 19, 1952

2,607,373

UNITED STATES PATENT OFFICE 2,607,373

SAFETY CONTROL MECHANISM FOR BAND SAW MACHINES

Robert L. Crane, Glen Lake, Minn., assignor to Continental Machines, Inc., Savage, Minn., a corporation of Minnesota Application May 10, 1950, Serial No. 161,055

4 Claims. (Cl. 143—27)

My invention relates to machine tools of the type employing an endless cutting band, such as a band saw or the like, and more specifically to improvements in machine tools of the above type, whereby to increase the efficiency and safety of operation thereof.

An important object of my invention is the provision of means for maintaining a uniform selected band tensioning pressure upon the cutting band irrespective of expansion or contraction of the band.

Another object of my invention is the provision of tensioning pressure means for the cutting band which will maintain said cutting band at a predetermined tension for an appreciable length of time after the machine has been shut down.

Another object of my invention is the provision of means responsive to breakage of the cutting band for automatically and immediately rendering the machine inoperative.

Still another object of my invention is the provision of brake mechanism associated with the band-carrying wheels of a machine tool, as set forth, said brake mechanism responsive to breakage of the cutting band to quickly stop rotation of said wheels.

Another object of my invention is the provision of fluid pressure means for applying tension to said cutting band.

Generally stated, the invention consists of the novel devices, combinations of devices and arrangement of parts hereinafter described and defined in the claims.

In the accompanying drawings, like characters indicate like parts throughout the several views.

Referring to the drawings:

Fig. 2 is an enlarged vertical section taken substantially on the line 2—2 of Fig. 1;

Fig. 3 is a fragmentary detail, partly in front elevation and partly in section, taken substantially on the line 3—3 of Fig. 2;

Fig. 4 is a fragmentary detail in elevation, as seen from the line 4—4 of Fig. 2;

Fig. 5 is a diagrammatic view illustrating the fluid pressure system of my invention;

Fig. 6 (sheet 2) is a view in perspective of a valve element of Fig. 5, utilized in the fluid pressure system; and Fig. 7 (sheet 3) is a wiring diagram incorporated in my invention.

Figure 1:
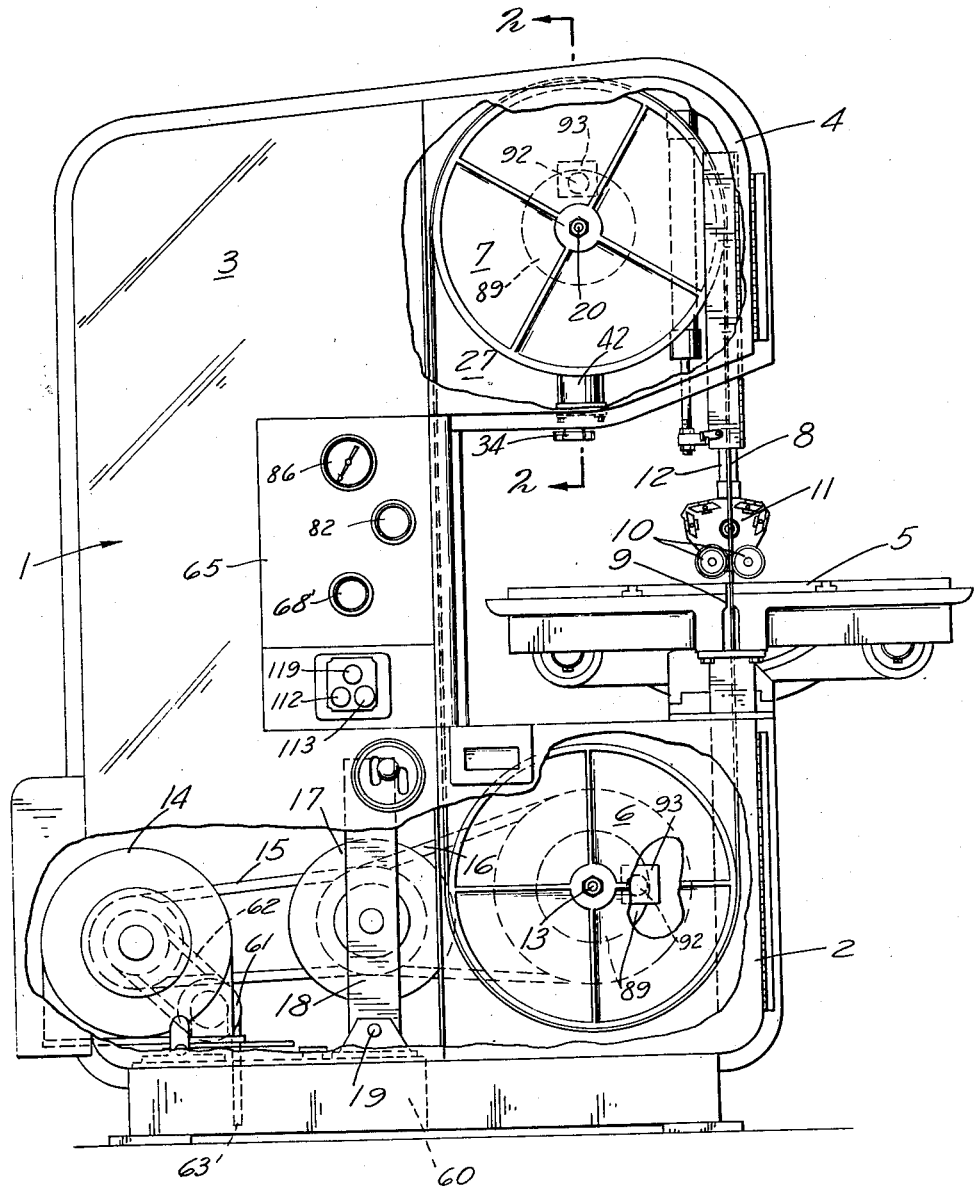
Fig. 1 is a view in front elevation of a sawing machine built in accordance with my invention.

Referring with greater detail to the drawings, the numeral 1 indicates in its entirety a frame structure comprising a base 2, a generally vertical column 3, and a head 4. The head 4 projects laterally outwardly of the upper end of the column 3, overlying a laterally projected portion of the base 2, to form a throat or working space in which is disposed a work table 5 mounted on the base 2. A band saw carrying drive wheel 6 is mounted on the base 2 below the table 5, and an idler wheel 7 is mounted for rotation in the head 4 in tandem relationship to the drive wheel 6. An endless cutting band 8, in the nature of a band saw or the like, runs over the wheels 6 and 7 and through a slot 9 in the work table 5, being guided by guide rollers 10 of a saw guide 11, secured to the head 4 by means of a supporting post 12. The drive wheel 6 is mounted fast on a shaft 13, which is driven from a drive motor 14, by means of V-belts 15 and 16, a conventional variable speed pulley 17 and suitable transmission mechanism, not shown, but contained within the base 2. The variable speed pulley 17 is journalled to a mounting bracket 18 pivotally secured to the base 2, as indicated at 19. The variable speed pulley 17 and transmission mechanism, and other transmission mechanism, not shown, form no pertinent part of the instant invention, and it is thought that detailed showing and description thereof is therefore unnecessary.

The idler wheel 7 is mounted fast on the outer end of shaft 20, which is journalled in a floating bearing bracket 21 by means of spaced anti-friction bearings 22 and 23. The bearing bracket 21 is pivotally mounted on a shaft 24 extending transversely of a supporting member 25, which is mounted for vertical sliding movements on a mounting plate 26 rigidly secured to a wall section 27 of the head 4 by nut-equipped bolts or the like 28. The bearing bracket 21 is provided with an upstanding lug 29, which forms the base of support for one end of a compression spring 30 interposed therebetween and the upper end portion of the supporting member 25, whereby to bias the bearing bracket 21 in one direction of pivotal movement about the axis of the shaft 24. A depending ear 31 integrally formed with the bearing bracket 21 is adapted to have abutting engagement with one end of a push rod 32 axially slidable in a laterally extended boss 33 integrally formed with the supporting member 25 at its lower end. The push rod 32 is adapted to be moved by an adjustment knob or hand wheel 34 rigidly mounted on a vertical shaft 35 journalled in the bottom portion of the head 4. The upper end of the shaft 35 is cross-sectionally polygonal, as indicated at 36, and has telescoping engagement with the lower end of a sleeve 37, the upper end of which telescopes over the lower end 38 of a screw-threaded shaft 39. The shaft 39 has screw-threaded engagement with a threaded portion of a bracket 40 integrally formed with the boss 33, and engages one side of a block-like lever 41 pivotally mounted on the bracket 40. A portion of the lever 41 engages the projecting end of the push rod 32 and is adapted to move the push rod upon rotation of the knob 34 in one direction to tilt the idler wheel 7 in one direction against bias of the compression spring 30. Rotation of the knob 34 in the opposite direction will cause the screw or shaft 39 to be moved away from the lever 41, permitting the spring 30 to tilt the idler wheel 7 in the opposite direction. It should be noted that when the cutting band 8 is mounted on the wheels 6 and 7, tension of the cutting band 8 will be added to the bias of the spring 30 to cause the depending ear 31 of the bearing bracket 21 to bear against the adjacent end of the push rod 32. This load is transferred through the lever 41 to the screw 39 and the bracket portion 40 in all positions of the supporting member 25, with respect to the mounting plate 26. By reference to Fig. 2, it will be seen that the telescopic sliding relationship between the lower end 38 of the screw 39 and the sleeve 37 permits free vertical movement of the screw 39 and associated parts, with respect to the knob 34.

For the purpose of raising and lowering the idler wheel 7 and bearing bracket 21 therefor with respect to the drive wheel 6 to make possible the application of the cutting band 8 to the wheels 6 and 7 and to apply proper tension to the cutting band 8, I provide fluid pressure operated means in the nature of a fluid pressure actuator cylinder 42 and a cooperating piston 43. A plunger rod 44 is mounted for limited axial sliding movements with respect to the piston 43 and projects axially outwardly of one end of the cylinder 42, terminating at its upper end in a slack motion connection with the supporting member 25. With reference to Figs. 2 and 3, it will be seen that the cylinder 42 is rigidly mounted by machine screws or the like 45 to the lower end of the supporting member 26. A snap ring or collar 46 at the lower end of the piston rod or plunger 44 engages one side of the piston 43 whereby to limit axial movement of the plunger rod 44 with respect thereto in one direction. A coil compression spring 47 is interposed between the side of the piston 43 opposite the snap ring 46 and a second snap ring or collar 48 axially outwardly spaced from the piston 43, and biases the piston 43 toward engagement of its lower face with the snap ring 46, for a purpose which will hereinafter be described. A cup-like washer 48' between the upper end of the spring 47 and the snap ring 48 retains the spring 47 in proper position about the plunger 44. Adjacent its upper end portion, the piston rod 44 is provided with a diametrically enlarged collar-forming portion 49 to which is rigidly secured a laterally-projecting arm 50. Above the arm 50, the plunger rod 44 is diametrically reduced as indicated at 51, said reduced portion 51 extending upwardly through a downwardly-opening recess 52 in the supporting member 25. The portion 51 further extends through an opening in the end wall 53 of the recess 52 and terminates thereabove in a diametrically-enlarged head 54. As shown, when the arm 50 engages the lower end of the supporting member 25, the head 54 is in vertically-spaced relationship to the end wall 53 of the recess 52 whereby to provide said slack motion connection. A coil compression spring 55 encompasses the portion 51 of the plunger rod 44 within the recess 52 and exerts yielding bias to the supporting member 25, bearing bracket 21, and idler wheel 7 carried thereby, in an upward direction. The outer end of the arm 50 is adapted to engage a button 56 operatively associated with a normally closed switch 57 contained within a switch housing 58 and mounted for common movements with the supporting member 25, bearing bracket 21, and idler wheel 7 by a mounting plate 59 rigidly secured thereto and to the supporting member 25.

Fluid under pressure is supplied selectively to opposite ends of the cylinder 42 from a supply tank 60 by a pump 61 driven from the motor 14 through the medium of a V-belt 62 running over suitable pulleys on the motor and pump. The pump 61 is interposed in a fluid pressure conduit 63 which extends to a check valve 64 in a valve block 65. A passage 66 in the valve block 65 extends from the check valve 64 to a valve chamber 67 in which is mounted a directional valve element 68. A pair of conduits 69 and 70 extend from the valve chamber 67 to the lower and upper ends respectively of the cylinder 42. As shown in Figs. 5 and 6, the valve element 68 is formed to provide circumferentially-spaced axially-extending faces or sides 71, 72, and 73, which cooperate with the circular wall of the chamber 67 to define circumferentially-spaced valve compartments 71', 72', and 73'. The valve element 68 is further provided adjacent one end with a transverse passage 74 extending from the face 71 to the side of the element 68 between the faces 72 and 73. A second passage 75 extends axially inwardly from the opposite end of the valve element 68 terminating short of the transverse passage 74 and has communication with a pair of passages 76 which extend radially inwardly, one each from one of the faces 72 and 73. A passage 77 in the valve block 65 communicates with the passage 75 and has connection with a fluid return conduit 78 leading therefrom to the supply tank 60. As shown, a pressure relief valve 79 has connection with the fluid pressure conduit 63, as indicated at 80, and with the return conduit 78 as at 81. Manipulation of the valve element 68 by means of its handle 68' to the position thereof shown in Fig. 5 permits fluid to be forced under pressure from the supply tank 60 through the pressure conduit 63, the passage 66, the chamber 71', the passage 74 in the valve element 68, and the conduit 69 to the lower end of the cylinder 42, whereby to raise the piston 43, piston rod 44, and supporting member 25, thus applying tensioning pressure to the cutting band 8.

Use of cutting bands of various widths in machines of the type exemplified generally requires that blades of different widths are maintained at different degrees of tension. For example, the tensioning pressure necessary to place a cutting band three sixteenths inch wide under proper tensile strain for accurate work will usually be insufficient for a band one inch wide. For the purpose of applying proper tensioning pressure to bands of different widths I provide an adjustable pressure regulator valve 82 in the valve block 65. As shown in Fig. 5, one side of the pressure regulator valve 82 communicates with the passage 66 in the valve block 65 through a conduit 83 and a passage 84. The opposite side of the valve 82 communicates with the fluid return conduit 78 by a passage 85 in the valve block 65 extending to the passage 77 therein. A conventional pressure gauge 86 is shown as being connected to the conduit 83 for indicating the exact pressure applied to the piston 43. Inasmuch as the pump 61 operates continuously during operation of the machine and delivers a constant supply of fluid, a greater part of the fluid supplied to the valve block 65 is by-passed through the pressure regulator valve 82 and returns to the supply tank 60. A pressure relief valve 79 provides an additional safeguard to the fluid pressure system and insures a maximum safe operating pressure. During upward movements of the piston 43, fluid in the upper portion of the cylinder 42 will be moved through the conduit 70 into the chamber 73' from whence it will flow through the passage 76 extending inwardly from the face 73 and passage 75 of the valve element 68 into the passage 77 and return conduit 78 to the supply tank 60. Movement of the valve element 68 in a clockwise direction with respect to Fig. 5, sufficient to effect communication of the passage 74 with the conduit 70, will cause fluid under pressure to be delivered through the conduit 70 to the upper portion of the cylinder 42 to cause downward movement of the piston 43 and subsequent loosening of tension of the cutting band 8. Fluid from the bottom portion of the cylinder 42 is delivered through the conduit 69 to the passage 76 opening onto the side 72 of the valve element 68 from whence it flows to the supply tank 60 through the passages 75 and 77 and the return conduit 78.

Inasmuch as the pump 61 is dependent for its operation on the motor 14, shutting down of the motor 14 will shut off pressure of fluid to the lower end of the cylinder 42. It should be noted, however, that when fluid under pressure is supplied to the lower portion of the cylinder 42, the piston 43 will raise with respect to the plunger rod 44 until the spring 47 is compressed. Continued upward movement of the piston 43 will then raise the plunger rod 44, thereby compressing the spring 55 and raising the supporting member 25 and parts carried thereby, including the idler wheel 7. When the drive motor 14 and pump 61 are manually shut off, fluid gradually leaks from the lower end portion of the cylinder 42 backwardly through the system. During this interval, the spring 47 expands to maintain the cutting band 8 under substantially its operating tension for an appreciable length of time so that, when the machine is restarted, the cutting band 8 is in a sufficiently taut condition to prevent its slipping off from the wheels 6 and 7. In other words, the spring 47 acts in the same manner as a conventional fluid pressure accummulator to accomplish the above end.

It is desirable, when the motor 14 is shut off for any reason, to automatically cause the band-carrying wheels 6 and 7 to decelerate rapidly to a complete stop. To accomplish this end, I provide a fluid pressure-operated brake mechanism associated with each of the wheels 6 and 7. The brake mechanism for the drive wheel 6 is identical to that associated with the idler wheel 7. Hence, for the sake of brevity, only the brake mechanism associated with the idler wheel 7 is disclosed in detail. As shown in Fig. 2, a flanged coupling 87 is keyed or otherwise rigidly secured to the rear end of the idler wheel shaft 20 and is provided with a plurality of circumferentially-spaced axially rearwardly-projecting pins 88 on which is mounted for sliding movements an annular braking plate 89. The plate 89 is biased toward engagement with the coupling 87 by coil compression springs 90 on the several pins 88 and interposed therebetween and the outer ends of said pins. The plate 89 partakes of common rotation with the shaft 20, the outer edge portion thereof moving between a pair of brake shoes 91 and 92, the former of which is relatively stationary and the latter of which is relatively movable in a direction axially of the plate 89. The brake shoe elements 91 and 92 are mounted in a supporting bracket 93 rigidly secured to the rear end of the floating bearing bracket 21 and provided with a fluid pressure cylinder 94 in which is mounted a piston 95 rigidly secured to the movable brake shoe element 92. It will be assumed that the supporting bracket 93 for the brake mechanism associated with the drive wheel 6 is suitably rigidly secured to the transmission housing not shown but contained within the base 2 of the machine. By particular reference to Fig. 2, it will be seen that the piston 95 is adapted to move the brake shoe element 92 and the braking plate 89 axially toward the brake shoe element 91 against bias of the springs 90, when fluid under pressure is admitted to the interior of the cylinder 94. The cylinder 94 associated with each of the wheels 6 and 7 is supplied with fluid under pressure from the pump 61 through a conduit 96 (Fig. 5) which terminates in a solenoid-operated valve 97 and is adapted to have communication with a conduit 98, which is connected to the conduit 63. The valve 97 is of the type commonly used in fluid pressure systems and includes a valve element 99 which is movable from a position wherein the fluid to the brake mechanisms may be discharged to the supply tank through a conduit 100, or to a position wherein fluid under pressure flows from the pump 61 through the conduit 98, the valve 97, and the conduit 96 to the brake mechanisms to set the same.

Operation of the machine is controlled by a plurality of elements including the switch 57 and the solenoid-operated valve 97. Referring to the wiring diagram of Fig. 7, it will be seen that the drive motor 14 is connected to opposite sides of a high voltage power line 101 by a pair of leads 102 and 103. Interposed in the lead 103 is a pair of spaced switch contacts 104 of a magnetically-operated switch 105. The contacts 104 are adapted to be closed by a connector 106 secured to the armature 107 of the switch 105. The electromagnetic winding 108 of the switch 105 lies in a low voltage or pilot circuit comprising a lead 109 extending from one of a pair of low voltage power lines 110 and a lead 111 extending thereto from the other of said pair of lines 110. Interposed in the lead 109 in series connection are a normally open momentary contact push button switch 112 and a normally closed push button switch 113. The normally closed switch 57 and the electromagnetic winding 114 of the solenoid-operated valve 97 are connected in series in the lead 111. A holding circuit for the winding 108 comprises a pair of leads 115 and 116 branching from the lead 109 on opposite sides of the normally open switch 112. The leads 115 and 116 terminate in contact elements 117 which are adapted to be interconnected by a contact bar 118 secured to the armature 107 of the magnetic switch 105. For operating the drive motor 14 independently of the magnetic switch 105, I provide a manually-operated normally open push button switch 119 interposed in a lead 120 shunted around the switch contacts 104 in the lead 103. The switch 119 is of the momentary contact type and must be held closed for the desired length of operating time of the motor 14. This switch permits operation of the motor 14 independently of the condition of the switch 57. As shown, the solenoid-operated valve 97, in its energized condition, closes off the conduit 98 and permits the flow of fluid from the conduit 96 to the conduit 100. However, as indicated by dotted lines in Fig. 5, de-energization of the electromagnetic winding 114 of the solenoid-operated valve 97 permits spring 121 to move the valve element 99 to its dotted line position of Fig. 5 to permit fluid under pressure to flow from the conduit 98 to the brake cylinder 94 through the conduit 96.

Before a cutting band 8 is mounted on the wheels 6 and 7, the spring 55 is in an expanded condition causing the outer end of the arm 50 to engage the bottom 56 of the switch 57 to hold the same in an open position. With the switch 57 in an open condition, the drive motor 14 and fluid pressure pump 61 can be operated only through manipulation of the switch 119. After the band 8 has been placed over the wheels 6 and 7, the operator sets the valve element 68 in the position illustrated in Fig. 5 and closes the switch 119 whereby to energize the motor 14 and cause fluid to be pumped to the lower portion of the cylinder 42. The switch 119 is held closed until the idler wheel 7 is raised by the piston 43 and plunger rod 44 to a point where the desired tension on the cutting band 8 is registered on the pressure gauge 86. When the tensioning pressure is applied to the cutting band 8, the springs 47 and 55 are both compressed, the bias of the spring 55 being entirely overcome and the inner end of the arm 50 being in engagement with the lower end of the supporting member 25. Raising of the arm 50 with respect to the supporting member 25 permits the switch 57 to close, thus bringing the pilot circuit into condition for closing by the switch 112. When the switch 112 is closed, the electromagnetic winding 108 of the magnetic switch 105 is closed, causing the motor 14 to become energized and the holding circuit comprising the leads 115 and 116 to be closed. While the machine is running, the cutting band 8 is caused to track correctly on the wheels 6 and 7 by manipulation of the wheel-tilting knob 34. Expansion of the cutting band 8 during operation of the machine is compensated for by continuous pressure of the fluid in the bottom portion of the cylinder 42, the fluid supply being continuous from the pump 61. Should the cutting band 8 accidentally run off from one of the wheels 6 and 7, or if the cutting band 8 should break, the downward band-tensioning pressure of the idler wheel-supporting member 25 is removed, permitting bias of the spring 55 to raise the same and the switch 57 with respect to the plunger rod 44 and the arm 50 thereon, whereby engagement of the arm 50 with the push button 56 will open the circuit to the electromagnetic winding 108 and render the motor 14 inoperative. As hereinbefore noted, opening of the switch 57 causes the solenoid-operated valve 97 to move to a position permitting application of fluid under pressure to the brake cylinders 94 and causing the brake shoes 91 and 92 to exert braking pressure on the annular braking plates 89. This pressure lessens as the motor 14 and pump 61 decelerate to a complete stop at which time the pressure ceases. However, sufficient pressure is applied during the deceleration interval to be effective in stopping rotation of the wheels 6 and 7.

To move the idler wheel 7 in the direction of the drive wheel 6, it is merely necessary to manipulate the valve element 68 to permit fluid under pressure to be pumped to the upper part of the cylinder 42 and to close the switch 119 to start the motor 14 and pump 61 for a sufficient period of time to permit the fluid under pressure to move the piston 43 to the bottom of the cylinder 42. Under normal conditions, when the machine is manually shut off by opening the switch 113, the circuit through the electromagnetic winding 114 of the solenoid-operated valve 97 is broken to automatically cause the brakes associated with the wheels 6 and 7 to be set. This feature of the invention permits the cutting band to be stopped very quickly, thus enabling an operator to control the cutting to a nice degree and, in the case of band breakage, rapid stopping of rotation of the wheels 6 and 7 prevents the cutting band from becoming entangled and further damaged.

From the above it should be obvious that the fluid pressure arrangement herein disclosed will maintain a predetermined band tensioning pressure against the piston 43 irrespective of volumetric displacement in the expansion chamber defined by the piston 43 and the cylinder 42.

My invention has been thoroughly tested and found to be fully satisfactory for the accomplishment of the objectives set forth; and, while I have shown and described a commercial embodiment of my improved machine, it will be understood that the same is capable of modification without departure from the spirit and scope of the invention as defined in the claims.

What I claim is:

1. In a machine of the class described, a frame structure, a drive wheel journalled on the frame structure, a floating bearing mounted and guided in the frame structure for movements toward and away from the drive wheel, an idler wheel journalled in said bearing, an endless cutting band running over said wheels, power operated mechanism imparting rotation to said drive wheel, said power operated mechanism including a motor, band tensioning pressure mechanism urging the idler wheel bearing away from the drive wheel and applying a predetermined pressure to the cutting band, said pressure mechanism comprising a fluid pressure cylinder, a cooperating piston plunger extendable in the direction of the floating bearing and being operatively engageable therewith under movements thereof in one direction of the bearing while allowing the bearing to move independently thereof in the same direction, a pump driven by said motor, and fluid pressure connections between said pump and cylinder, yielding means interposed between the plunger and said bearing and biasing said bearing and idler wheel away from said piston plunger, said yielding means exerting less pressure on the bearing than said pressure mechanism whereby said yielding means will be overcome by the pressure mechanism, and safety control cut-off mechanism, said safety control mechanism comprising a switch element controlling energization of the motor and a switch operating element normally maintaining the switch element in a condition to energize said motor, means mounting one of said elements for common movements with the floating bearing, and the other thereof for common movements with said piston plunger, breakage of the cutting band permitting said yielding means to move the bearing and the element mounted thereon with respect to the piston plunger and element associated therewith in a direction to de-energize said motor.

2. The structure defined in claim 1 in which said switch element is mounted for common movements with said bearing, and in which said switch-operating element is mounted on said piston plunger for common movements therewith.

3. The structure defined in claim 1 in further combination with fluid pressure-operated brake means operatively associated with said wheels, fluid pressure connections between said brake means and said pump, and valve means interposed in said connections and controlled by said switch element, whereby said brake means are energized to stop rotation of said wheels when said yielding means moves said floating bearing with respect to the piston plunger upon breakage of the cutting band.

4. In a machine of the class described, a frame structure, a drive wheel journalled on the frame structure, a floating bearing mounted and guided in the frame structure for movements toward and away from the drive wheel, an idler wheel journalled in said bearing, an endless cutting band running over said wheels, power-operated mechanism imparting rotation to said drive wheel, said power-operated mechanism including a motor and manually-operated control means therefor, band tensioning pressure mechanism urging the idler wheel bearing away from the drive wheel and applying a predetermined pressure to the cutting band, said pressure mechanism comprising a fluid pressure cylinder, a piston in said cylinder, a piston plunger extendable in the direction of the floating bearing and being operatively engageable therewith under movements thereof in one direction of the bearing while allowing the bearing to move independently thereof in the same direction, yielding means interposed between said piston and said plunger within said cylinder, a pump driven by said motor, fluid pressure connections between said pump and cylinder, said yielding means maintaining tensioning pressure upon the cutting band when said motor is rendered inoperative by said manually-operated means, spring means interposed between said plunger and said bearing and biasing said bearing and idler wheel away from said piston plunger, said spring means exerting less pressure thereon than said pressure mechanism whereby said spring means will be overcome by the pressure mechanism, safety control cut-off mechanism or said motor, said safety control mechanism comprising a switch element controlling energization of the motor, a switch operating element normally maintaining the switch element in a condition to energize the motor, and means mounting one of said elements for common movements with said piston plunger and the other thereof for common movements with said floating bearing, breakage of the cutting band permitting said yielding means to move the bearing and the element mounted thereon with respect to the piston plunger and element associated therewith in a direction to deenergize said motor.

ROBERT L. CRANE.

REFERENCES CITED

The following references are of record in the file of this patent:

UNITED STATES PATENTS

| Number | Name | Date |
|---|---|---|
| 313,035 | Vernon | Feb. 24, 1885 |
| 721,966 | Prescott et al. | Mar. 3, 1903 |
| 798,569 | Cleveland | Aug. 29, 1905 |
| 1,074,197 | Pelton | Sept. 30, 1913 |
| 1,927,203 | De Groot | Sept. 19, 1933 |
| 2,205,632 | Schwarz et al. | June 25, 1940 |
| 2,311,268 | Tannewitz | Feb. 16, 1943 |
| 2,372,393 | Ray | Mar. 27, 1945 |
| 2,395,237 | Swenson | Feb. 19, 1946 |

FOREIGN PATENTS

| Number | Country | Date |
|---|---|---|
| 751,826 | France | July 3, 1933 |